United States Patent
George

[19]

[11] Patent Number: 5,806,903
[45] Date of Patent: Sep. 15, 1998

[54] SHAFT HOLDER

[76] Inventor: Stanley R. George, 17930 Ludlow St., Granada Hills, Calif. 91344

[21] Appl. No.: 608,666

[22] Filed: Mar. 1, 1996

[51] Int. Cl.$^6$ ........................................................ B25J 1/04
[52] U.S. Cl. ........................ 294/19.1; 81/53.11; 116/173; 294/92
[58] Field of Search ............................. 294/5.5, 15, 19.1, 294/22, 33, 92, 99.1, 148, 166, 171; 40/606, 607, 642.01, 660; 43/21.2; 52/720.1, 736.1, 736.2; 81/53.1, 53.11, 53.12; 116/173; 248/309.1, 314, 316.1, 316.7, 511, 520, 523, 535, 538, 539

[56] References Cited

U.S. PATENT DOCUMENTS

| 705,775 | 7/1902 | Moore . |
| 817,741 | 4/1906 | Armstrong . |
| 906,415 | 12/1908 | Hallgren . |
| 1,198,840 | 9/1916 | Hanck et al. ........................ 116/173 X |
| 1,205,372 | 11/1916 | Martin . |
| 1,213,278 | 1/1917 | Seashore ................................ 294/19.1 |
| 1,830,690 | 11/1931 | Barlow . |
| 2,249,302 | 7/1941 | Smith ...................................... 43/21.2 |
| 2,394,050 | 2/1946 | Goza ....................................... 294/171 |
| 2,724,569 | 11/1955 | Licata ..................................... 43/21.2 |
| 3,788,693 | 1/1974 | Farrington ............................. 81/53.11 |
| 4,089,553 | 5/1978 | Frykholm . |
| 4,230,357 | 10/1980 | Bosch et al. . |
| 4,655,492 | 4/1987 | Landry .................................. 294/92 X |
| 5,379,666 | 1/1995 | Held . |
| 5,437,122 | 8/1995 | Wilson .................................... 43/21.2 |
| 5,446,989 | 9/1995 | Stange et al. ........................... 43/21.2 |

*Primary Examiner*—Johnny D. Cherry
*Attorney, Agent, or Firm*—William W. Haefliger

[57] ABSTRACT

An apparatus to elevate a generally horizontally elongated member comprising a generally horizontally lengthwise extending cradle to sidewardly receive a portion of the member into the cradle, to be supported in the cradle, the cradle having opposite ends; a part associated with the cradle and forming a projection above the portion of the member received in the cradle, the part closer to one end of the cradle than to the other end of the cradle to block upward tilting of the member at one end of the cradle.

11 Claims, 4 Drawing Sheets

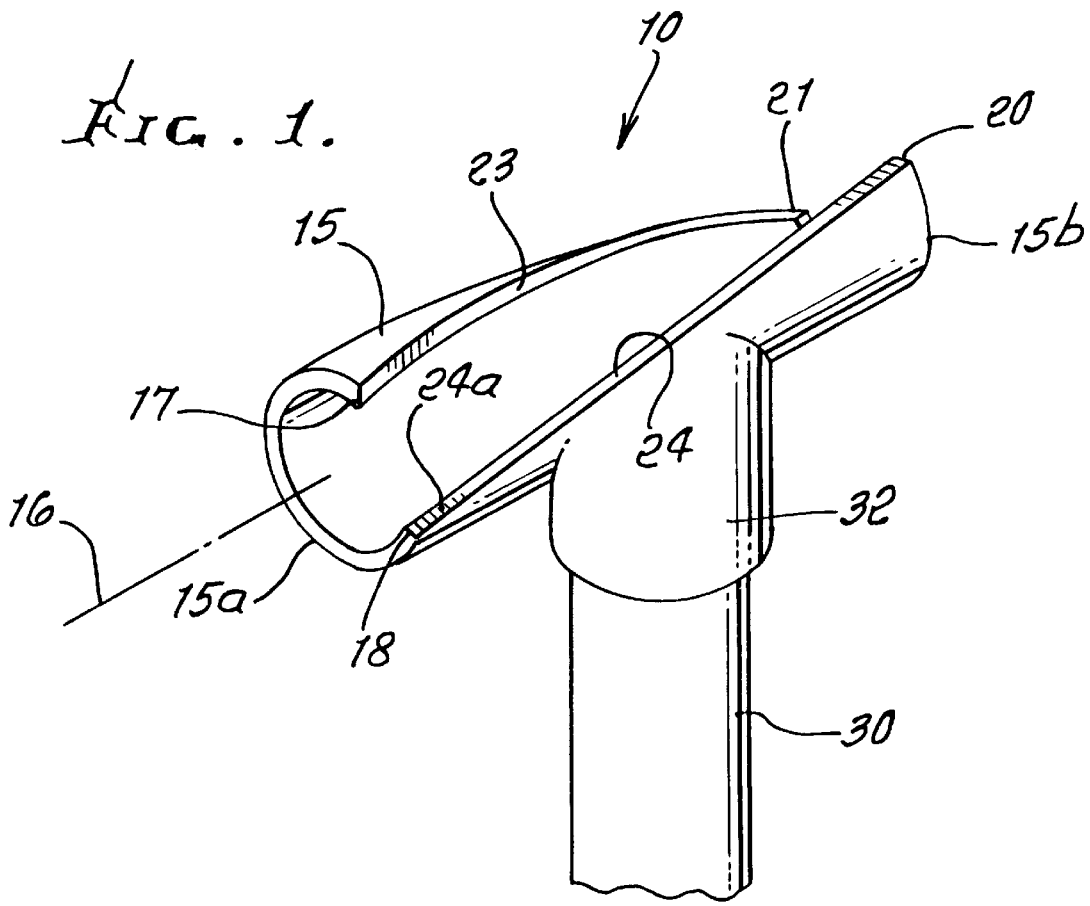
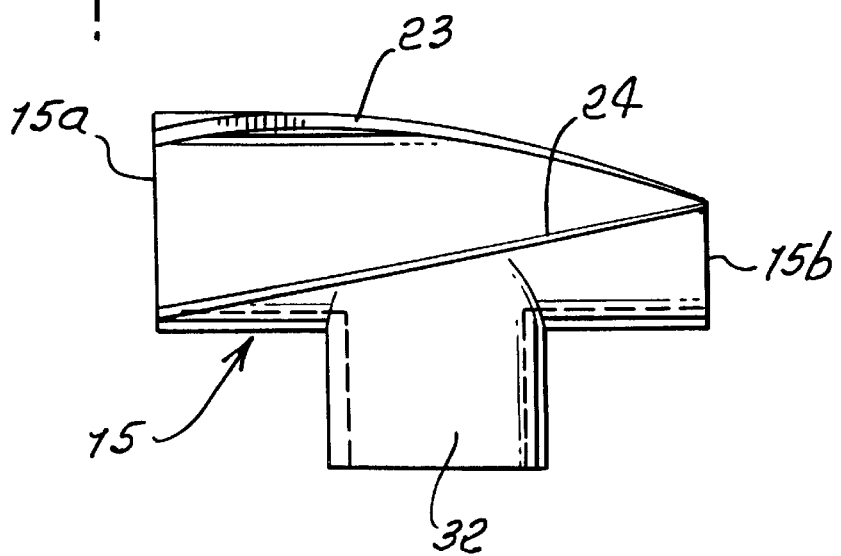

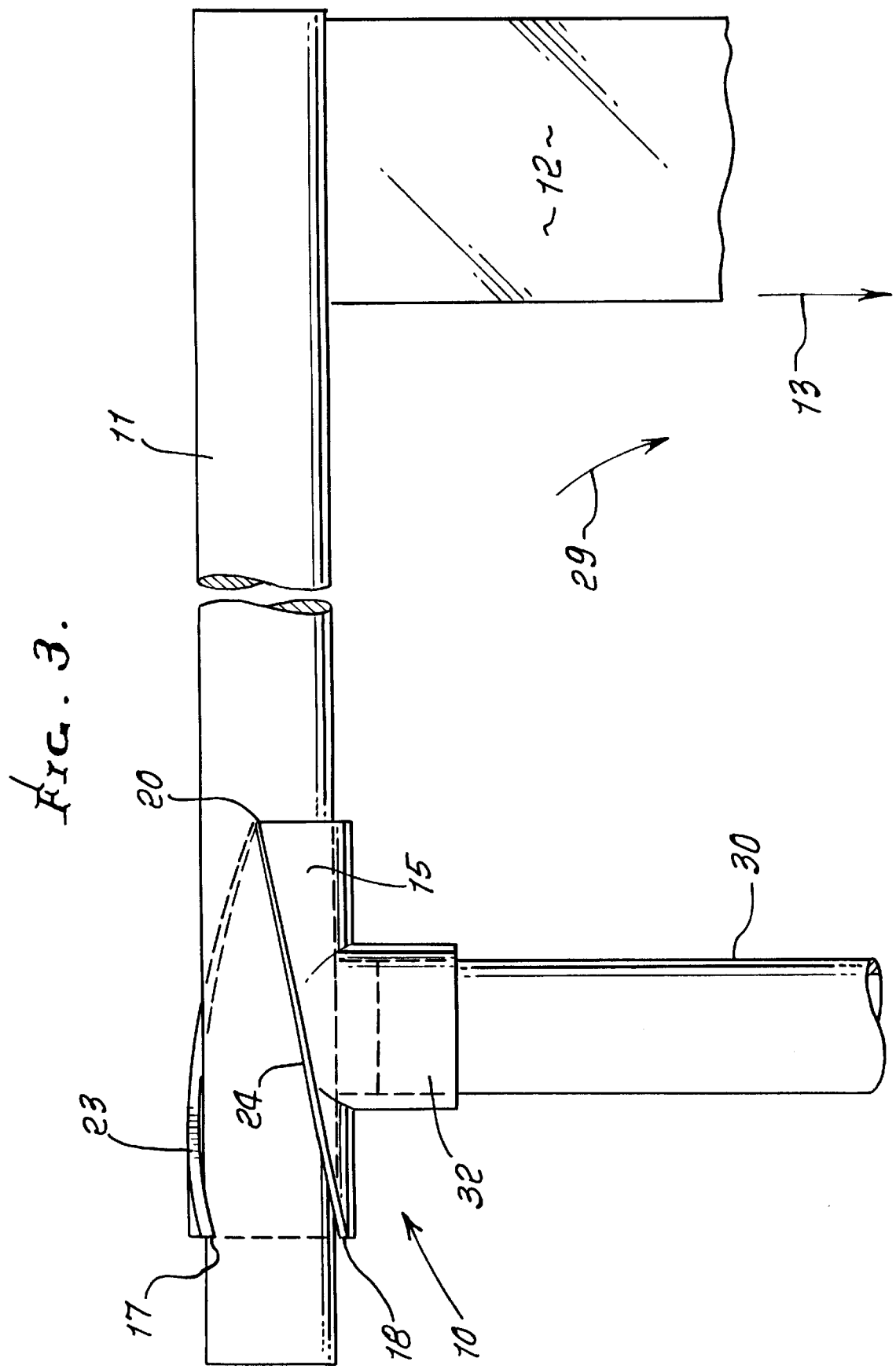

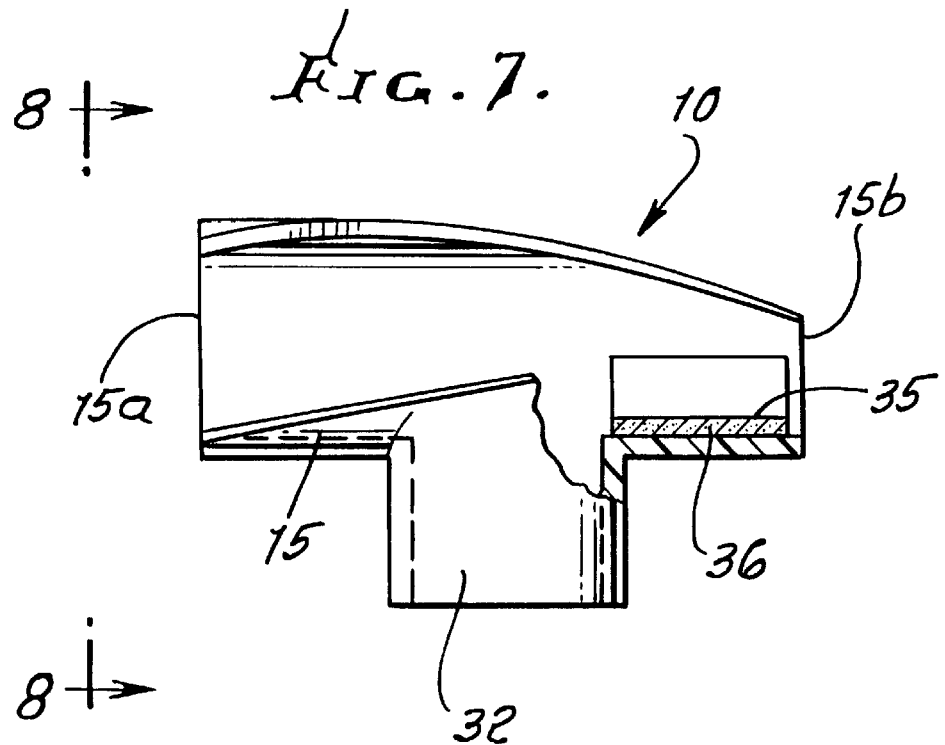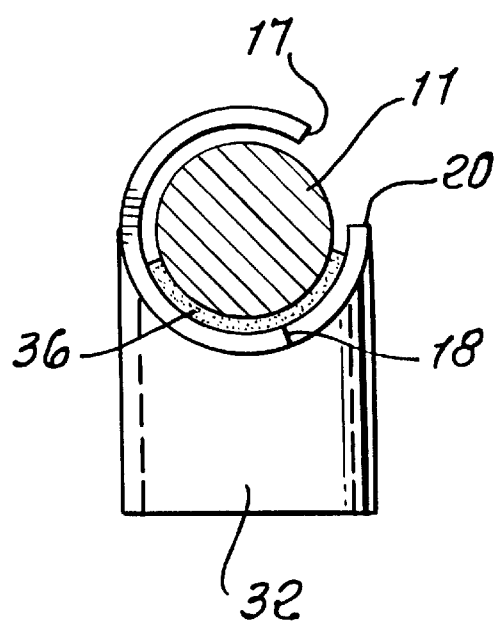

SHAFT HOLDER

BACKGROUND OF THE INVENTION

This invention relates generally to apparatus to hold or elevate a generally horizontally elongated member, as for example a flag pole; more particularly, it concerns cradling apparatus into which an elongated member may be easily sidewardly inserted, held against displacement from the cradling apparatus, as during elevation of the elongated member to desired position, and easily released from the apparatus.

Prior apparatus or devices to elevate elongated members, such as flag poles, either excessively gripped the pole, as by aligned C-shaped gripper or clips, or did not block tilting of the pole relative to the apparatus during pole elevation. A tendency to pole tilting occurs due to unbalanced support of the pole on the apparatus, as for example may be produced by weight of a flag acting downwardly near one end of the pole. Also, such apparatus was difficult to use, in practice. There is need for improved pole elevating apparatus which avoids the problems referred to.

SUMMARY OF THE INVENTION

It is a major object of the invention to provide improvements in pole or elongated member sideward support, enabling ease of pole control support and final release, and also preventing pole tilting during elevation or lowering.

Basically, the apparatus of the invention comprises:

a) a generally horizontally lengthwise extending cradle to sidewardly receive a portion of the elongated member into the cradle, to be supported in the cradle, the cradle having opposite ends, b) a part associated with the cradle and forming a projection above the portion of the member received in the cradle, the part closer to one end of the cradle than to the other end of the cradle to block upward tilting of the member at one end of the cradle.

Typically, an upright, elongated handle supports the cradle, as for example at a location between opposite ends of the cradle.

More particularly, the cradle advantageously has two spaced apart and lengthwise extending edges that at least in part spiral about the portion of the member, and to form a spiral gap to pass the portion of the member into the cradle and locally under the projection. Such a spiral gap facilitates ease of pole sideward entry into the cradle, and pole sideward release from the cradle, as well as pole retention against tilting while received in the cradle. The cradle typically has an inner surface that is C-shaped toward the member.

A further object includes provision of high-friction material in the cradle and engaging the underside of the member to resist member slip relative to the cradle.

Yet another object is to provide a C-shaped cradle inner surface that defines a C-shaped cradle forward end, and a C-shaped cradle rearward end, the forward C-shaped end rotated about an axis defined by the cradle, relative to the C-shaped rearward end.

These and other objects and advantages of the invention, as well as the details of an illustrative embodiment, will be more fully understood from the following specification and drawings, in which:

DRAWING DESCRIPTION

FIG. 1 is a perspective view of apparatus incorporating the invention;

FIG. 2 is a side elevation of the FIG. 1 apparatus;

FIG. 3 is a view like FIG. 2 showing a supported flag pole;

FIG. 7 is a view like FIG. 2 showing a modification; and

FIG. 8 is an end view taken on lines 8—8 of FIG. 7.

DETAILED DESCRIPTION

Figure 5:
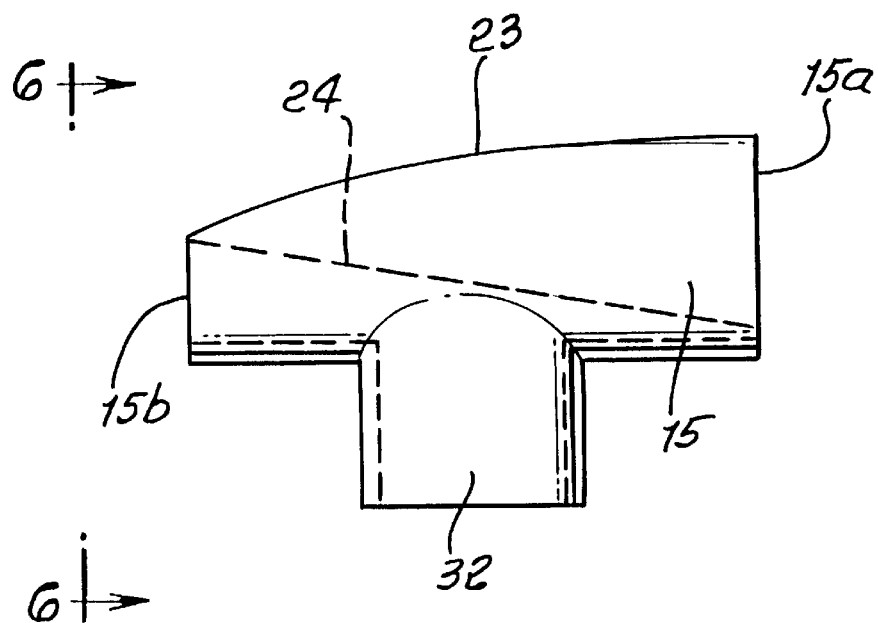
FIG. 5 is an elevation showing the opposite side of the FIGS. 1 and 2 apparatus.

In FIGS. 1–6, apparatus 10 is constructed to support and elevate a generally horizontally elongated member, such as flag pole 11 seen in FIG. 3. A flag 12 on the latter exerts weight downwardly in direction 13, tending to tilt the pole. The invention takes advantage of this configuration, since the more weight is downwardly exerted, the more secure the pole is, in supported position, as for reasons that will appear. Members other than flag poles include shafts, ducts, and elongated glass tubes, such as light bulbs. These are represented by 11 referred to below.

The apparatus 10 includes a generally horizontally lengthwise extending cradle 15 configured to sidewardly and downwardly receive a portion of the pole member, to be supported in the cradle. Note that the cradle is generally tubular, and has opposite ends at 15a and 15b, those ends being C-shaped but relatively rotated substantially less than 180° about an elongated axis 16 defined by the cradle. The C-shaped end 15a has terminals 17 and 18 defining a gap 19 therebetween sufficient to sidewardly pass the pole member 11, whereas C-shaped end 15b defines terminals 20 and 21 defining a gap 22 therebetween sufficient to sidewardly pass the pole member 11.

The cradle has two spaced apart edges 23 and 24, extending lengthwise between opposite ends 15a and 15b. Edge 23 extends between terminals 17 and 21, whereas edge 24 extends between terminals 18 and 20. Due to the relative rotation, as between the terminals at end 15a and the terminals at end 15b, the gap 19 extends along a generally spiral path, about axis 16, so as to allow sideward placement of the pole member into the cradle and sideward relative removal of the cradle from the pole. As seen in the drawings, the cradle has a bore and the gap has width throughout the cradle length that is substantially equal to, but less than, the diameter of said bore.

Note in particular that there is a part associated with the cradle and forming a projection above the portion of the member received in the cradle, the part closer to one end of the cradle than to the other end of the cradle to block upward tilting of the member at one end of the cradle. In the drawings, the referenced "part" is shown in the form of the end terminal 17, lying or projecting directly above the center of the pole member, to block pole tilting in the direction indicated by arrow 29 in FIG. 3, relative to the cradle. Therefore, elevation and lowering of a horizontally extending pole, without tilting, is facilitated in a very simple, efficient manner.

An elongated handle to support the cradle is shown at 30, and extends vertically downwardly, so that lifting and lowering of the handle elevates and lowers the cradle and the supported pole. One or both of the cradle and handle may consist of molded plastic material. The cradle can be easily formed from PVC pipe, as by cutting along straight edges 23 and 24, described above; and the handle may also consist of PVC pipe, connected to the cradle at molded plastic "tee" projection 32. A threaded connection may be provided between the tee and handle 30 to define a telescopic interfit.

Figure 4:
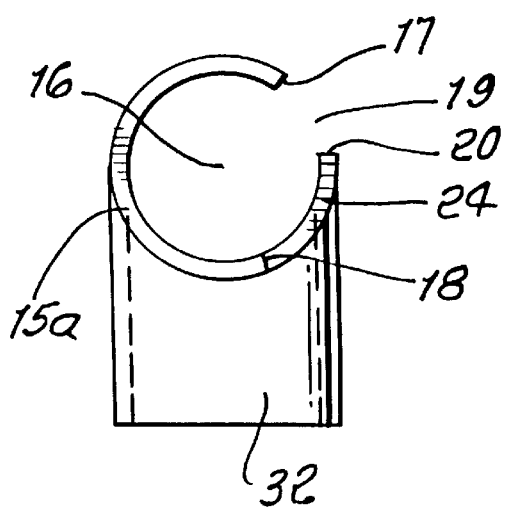
FIG. 4 is an end view taken on lines 4—4 of FIG. 2.
Figure 6:
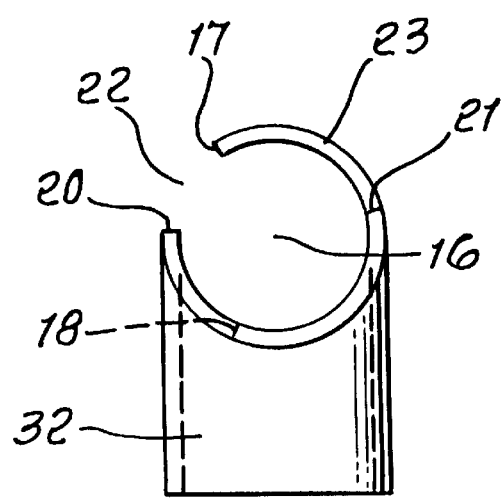
FIG. 6 is an end view taken on lines 6—6 of FIG. 5.

FIGS. 7 and 8 are the same as FIGS. 2 and 4 except for provision of a layer 35 of high-friction material 36 in the cradle, to engage the outer side of the received pipe member. Layer 35 may consist, for example, of rubber, or Neoprene, or a foam plastic cushion, about 1/32 to 1/4 inches thick. It resists endwise sliding, and rotation, of the pipe member relative to the cradle. Downward force of the pole exerted on layer 35, resulting from the weight of the flag imposed on the pole, adds substantially to the development of starting friction resisting sliding and rotation of the pole, relative to the cradle. Accordingly, the structure at end 15b of the cradle resists both vertical and horizontal movement of the pole, to enhance stability.

In FIG. 1, edge 24 may be further relieved, at 24a, to facilitate entry and exit of the pole into and out of the cradle.

I claim:

1. In apparatus to elevate a generally horizontally elongated cylindrical rigid member, the combination comprising
   a) a generally horizontally and longitudinally lengthwise extending generally tubular cradle to sidewardly and downwardly receive a portion of said member into the cradle, to be supported in the cradle, the cradle having opposite ends, which are endwise open,
   b) the cradle having a part forming a projection above said portion of said member received in the cradle, said part closer to said one end of the cradle than to the other end of the cradle to block upward tilting of said member at said one end of the cradle,
   c) the cradle having a longitudinal axis and defining a gap continuously spiraling about said axis from one of said open ends to the other, each of said ends being C-shaped to have gap width sufficient to sidewardly pass said member, the gap at one of said cradle ends located and facing horizontally laterally of said axis, and the gap at the other of said cradle ends facing upwardly above said axis, so as to be rotated substantially less than 180° about said axis relative to the gap at said one end.

2. The combination of claim 1 including an elongated, upright handle located beneath and supporting the cradle, the cradle having a lower projection that telescopically interfits the handle.

3. The combination of claim 2 wherein said handle is attached to the cradle at a location between and medially of said cradle opposite ends.

4. The combination of claim 2 wherein said cradle and lower projection consist of plastic material.

5. The combination of claim 1 wherein the cradle has two spaced apart and lengthwise extending edges that at least in part spiral about said portion of said member, and to form said gap to pass said portion of the member into the cradle and locally under said projection, said cradle having a bore and said gap having width throughout the cradle length that is substantially equal to but less than the diameter of said bore.

6. The combination of claim 1 including said member supported by the cradle and extending below said projection.

7. The combination of claim 6 wherein said member is one of the following:
   a shaft
   a flag staff
   a duct
   an elongated light bulb.

8. The combination of claim 1 including high-friction material in the cradle and engaging the underside of said member to resist member slip relative to the cradle.

9. The combination of claim 8 wherein the high-friction material is located to receive imposition of downward force exerted by the side of the pole, and created by the weight of a flag attached to the pole.

10. The combination of claim 1 wherein said cradle has an inner surface that is C-shaped.

11. The combination of claim 10 wherein said C-shaped inner surface defines a C-shaped cradle forward end, and a C-shaped cradle rearward end, said forward C-shaped end rotated about an axis defined by the cradle, relative to said C-shaped rearward end.

* * * * *